Feb. 10, 1959  H. HUBBELL  2,873,435
STRIPLESS WIRING FOR ELECTRICAL WIRING DEVICES
Filed Dec. 24, 1956

INVENTOR
Harvey Hubbell
BY
Wooster & Davis
ATTORNEYS.

United States Patent Office 2,873,435
Patented Feb. 10, 1959

2,873,435

STRIPLESS WIRING FOR ELECTRICAL WIRING DEVICES

Harvey Hubbell, Southport, Conn., assignor to Harvey Hubbell, Incorporated, Bridgeport, Conn., a corporation of Connecticut Application December 24, 1956, Serial No. 630,150

6 Claims. (Cl. 339—97)

This invention relates to a wiring connection for electrical wiring devices, and has for an object to provide a simple and effective means for connecting lead wires to such wiring devices, in which it is not necessary to strip the insulation from the lead wires before placing them in position in the wiring device, and in which the operation of connecting the lead wires to the contacts in the wiring device will automatically strip the insulation from the wires and at the same time establish electrial connection between the wires and the contacts.

Another object is to provide such a connecting means in which the unstripped end of the lead wire may be inserted in its position in the wiring device and then the proper securing of the lead wire and establishing of the proper electrical connection between this wire and a contact of the wiring device is secured by the mere manipulation of a screw.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 1:
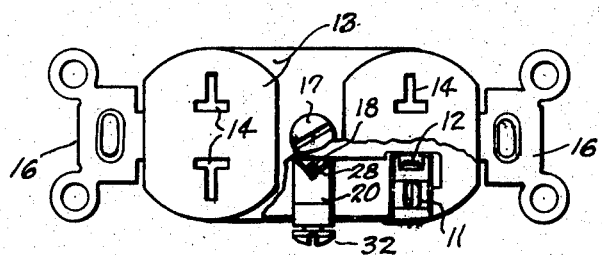
Fig. 1 is a partial front view of a duplex receptacle showing this improved wiring connection secured thereto and a part of the front plate broken away to more clearly show the construction.
Figure 2:
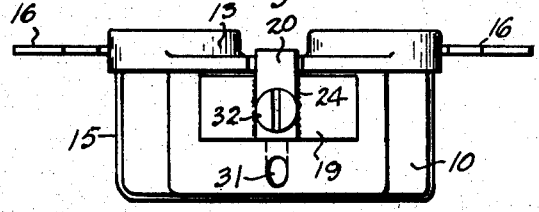
Fig. 2 is a side view thereof.

For the purposes of illustration this device is shown as applied to a wiring device comprising a duplex outlet receptacle of the type commonly used for mounting in the wall outlet box of a house wiring system, but it is to be understood the use of this lead wire connecting means is not limited to this type of wiring device but is equally adapted for use in other types of wiring devices, such, for example, as switches and similar devices, or any wiring device in which a lead wire is to be connected to a contact within the wiring device.

The receptacle shown comprises a body 10 of suitable molded insulating material within which is mounted any suitable type of receptacle contacts 11 and 12, only one of each of which is shown, behind a front or cover plate 13 also of insulating material, and provided with the inlet slots 14 for insertion of the contact blades of an attachment plug cap to engage the receptacle contacts. This receptacle is adapted for mounting in a wall outlet box by any suitable type of mounting strap or yoke 15 extending along the back and opposite ends of the body 10 and provided with the attaching ears 16 at its opposite ends for securing it in the box. The body 10, the front plate 13, and the mounting yoke 15 may be secured together by any suitable means, such, for example, as the screw 17.

Figure 6:
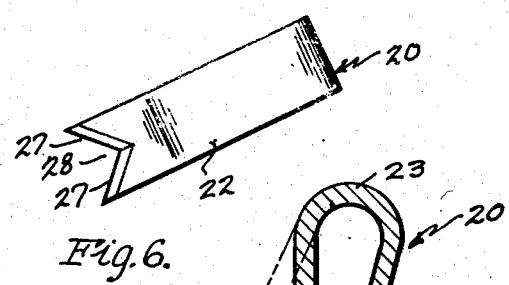
Fig. 6 is a top view thereof.
Figure 5:
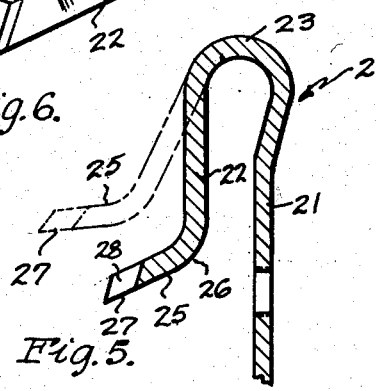
Fig. 5 is a section on an enlarged scale of the insulation stripping means.

For connecting a lead wire 18 to the contacts 11 and 12, there is provided in a recess in the side of the body 10, a conductor bar 19 connected at its opposite ends with the contacts 11 and 12 at the opposite ends of the receptacle, and mounted on this bar is a spring conductor strip 20. In the form shown this strip is bent to substantially U-shape, providing spaced legs 21 and 22 side by side and connected at their upper ends by a curved loop 23. The leg 21 is connected to the conductor bar 19 on either the outer or inner side thereof by any suitable means, such, for example, as soldering or welding, as shown at 24, with the other leg 22 on the inner side of the bar 19. This latter leg is provided with a free end portion 25 extending laterally inwardly from the bar 19, and preferably inclined downwardly somewhat as shown and forming a curved surface 26 at the joining bend between the body of this leg and the free end portion. At the free edge of this free end is provided a knife edge 27, and this knife edge is preferably formed in a notch 28 in the free end of the strip, and this notch is also preferably substantially V-shaped, as shown in Fig. 6, with the knife edge formed on the inclined opposite sides of this notch.

The insulating body member 10 is provided with means for positioning an insulation covered lead wire 18, the insulation being shown at 18a, in position adjacent and in alignment with the notched free end and therefore the knife edge of the strip 20. In the arrangement shown the body is provided with an inclined backing wall 29 at the bottom of the recess 30 in which the free end 25 of the strip is located, with an inclined opening 31 leading from the side of the body member to this recess and inclined wall 29, through which the unstripped free end of the insulation covered lead wire may be inserted and guided to the position shown in Figs. 3 and 4. Associated with the free end portion of the strip is an operating screw 32 threaded into the conductor bar 19 with its head 33 on the outer side of the bar where it is exposed for manipulation at the side of the body member 10, and with its free end 34 extending inwardly from the inner side of the bar and located in back of the free end portion 22 of the spring strip, preferably adjacent the curved surface 26 thereof. It is thus in position to cooperate with and have a camming action on this surface to shift the inclined free end portion 25 and the knife edge carried thereby inwardly for the operation of stripping a portion of the insulation from the lead wire and effecting the connection of the lead wire to the conductor bar and the electrical connection between the wire and this bar.

Figure 4:
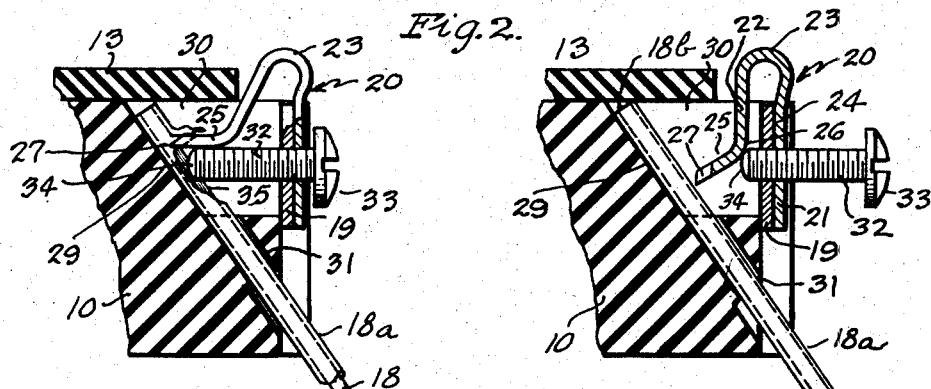
Fig. 4 is a similar section showing the parts in the secured position.
Figure 3:
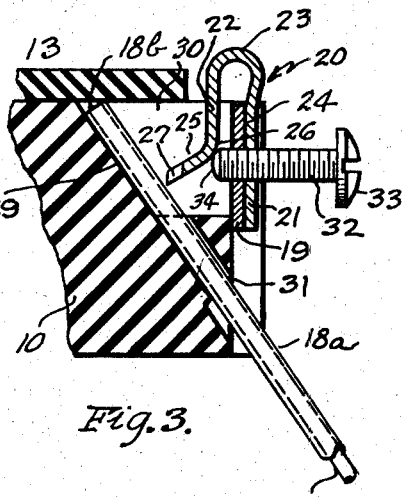
Fig. 3 is a detail section on an enlarged scale of the means for connecting the lead wire showing the normal unsecured position.

This operation is as follows:

Fig. 3 shows the spring conductor strip in its normal retracted position with its free end portion 22, 25 adjacent the inner side of the conductor bar 19 and with the operating screw retracted or in its outer position. The operator may now insert the unstripped insulation covered free end of the conductor lead wire 18 in the opening 31 until its free end 18b is stopped by the front plate 13, thus locating this free end of the conductor in the recess 30 on the inclined wall 29 and in alignment with the notched free end 28 and the knife edge 27 carried by this free end of the strip 20. Then by manipulating the screw 32 to shift it inwardly, as indicated in Fig. 4, its free end will have a camming action on the rear or outer wall of the free end portion 22, 25 of the strip, including the curved surface 26, and will shift this free end with the knife edge inwardly, as indicated in Fig. 4. The action will be to first force the knife edge into and through the insulation on the conductor wire, and then force this knife edge along the surface of the wire a sufficient distance to strip a portion of this insulation from the wire and expose it, as indicated at 35 in Fig. 4. Also, the parts are so arranged that this exposed portion of the wire is in alignment with the free end 34 of the screw so that further manipulation of the screw will clamp this free end of the screw against the exposed wire to effect a good electrical connection therewith, this electrical connection being also partly provided by engagement of the free knife edge of the spring strip with the wire and the contact of its rear wall with the screw. The inclined walls of the notched free end of the strip will prevent the lead wire from shifting sideways out of alignment with the end of the strip during this stripping and securing operation.

Thus it will be seen that to effect the connection of the lead wire to a contact in the wiring device, it is not necessary for the operator to strip the insulation from the lead wire prior to its insertion in the wiring device, but it is merely necessary to first insert the insulation covered or unstripped free end of the wire into position in the wiring device, as indicated in Fig. 3, and then manipulate the screw to secure a partial stripping of the wire and the proper electrical connection, as shown in Fig. 4. If desired, the wire may be disconnected by retracting the screw from the position of Fig. 4, permitting the free end of the spring conductor strip 20 to spring back to the retracted position of Fig. 3, thus releasing the lead wire and permitting its withdrawal from the wiring device.

Having thus set forth the nature of my invention, I claim:

1. In an electrical wiring device, an insulating body member, a conductor bar mounted in the body, means for connecting an insulation covered lead wire to said bar comprising a spring strip bent to substantially U-shape with legs side by side one of which legs is secured to the bar and the other has a free end portion extending laterally away from and inclined to the bar having a notched free end provided with a knife edge, means in the body member for positioning and supporting an insulation covered lead wire adjacent and in alignment with said notched end, and a screw threaded into the bar with its free end behind said second leg and operable by a camming action on said leg to force the knife edge into the insulation on the wire and then along the wire to strip the insulation therefrom.

2. In an electrical wiring device, an insulating body member, a conductor bar mounted in the body, means for connecting an insulation covered lead wire to said bar comprising a spring strip bent to substantially U-shape with legs side by side one of which legs is secured to the bar and the other of which is located at the inner side of the bar, said latter leg including a free end portion extending inwardly away from and inclined to the bar and provided with a notched free end having a knife edge, means in the body member for positioning and retaining an insulation covered lead wire adjacent and in alignment with said notched end, a screw threaded in and extending through the bar with its free end in back of the inner leg of the strip, and said free end of the screw operable by camming action on said latter leg to force the knife edge into the insulation on the wire and then along the wire to strip the insulation therefrom and then clamp the free end of the screw against the stripped wire for electrical contact therewith.

3. In an electrical wiring device, an insulating body member, a conductor bar mounted in the body, means for connecting an insulation covered lead wire to said bar comprising a spring strip secured to the bar including a free end portion located at the inner side of the bar and extending inwardly from the bar at an angle thereto, said free end having a knife edge, means in the body for positioning and supporting an insulation covered lead wire adjacent and in alignment with said free end, a screw threaded in and extending through the bar with its free end in back of said strip, said free end of the screw operable by camming action on the strip to force the knife edge into the insulation on the wire and then along the wire to strip the insulation therefrom, and the screw located to then clamp its free end against the stripped wire for electrical contact therewith.

4. The device of claim 3 in which the free end of the spring strip is provided with a substantially V-shaped notch having knife edges on the inclined sides thereof.

5. In an electrical wiring device, an insulating body member, a conductor bar mounted in the body, means for connecting an insulation covered lead wire to said bar comprising a spring strip secured to the bar and including an inclined free end portion provided with a knife edge, means in the body member for positioning and supporting an insulation covered lead wire adjacent and in alignment with said knife edge, and an operating screw in the bar provided with a free end located adjacent said strip and operable by camming action on the strip to force the knife edge into the insulation of the lead wire and then along the wire to strip the insulation therefrom.

6. The device of claim 5 in which the free end of the strip is notched with the knife edge on the sides of the notch and the screw is located to clamp its free end against the stripped wire for electrical contact therewith.

References Cited in the file of this patent

UNITED STATES PATENTS

| | | |
|---|---|---|
| 2,476,227 | Sellers | July 12, 1949 |
| 2,610,996 | Rickabaugh | Sept. 16, 1952 |
| 2,622,119 | Hubbell | Dec. 16, 1952 |
| 2,683,864 | Hubbell et al. | July 13, 1954 |